(12) United States Patent
Ushiwata et al.

(10) Patent No.: US 8,218,923 B2
(45) Date of Patent: Jul. 10, 2012

(54) OPTICAL WAVEGUIDE SUBSTRATE WITH OPTICAL FIBER FIXATION GROOVE, PROCESS FOR ITS PRODUCTION, STAMPS FOR USE IN THIS PRODUCTION PROCESS, AND OPTO-ELECTRONIC HYBRID INTEGRATED MODULE INCLUDING SAID OPTICAL WAVEGUIDE SUBSTRATE

(75) Inventors: Takami Ushiwata, Chiyoda-ku (JP); Koki Hirano, Chiyoda-ku (JP); Kozo Tajiri, Sanda (JP); Tomomi Makino, Ashiya (JP)

(73) Assignees: Hitachi Cable, Ltd., Tokyo (JP); Nippon Shokubai Co., Ltd., Osaka (JP)

( * ) Notice: Subject to any disclaimer, the term of this patent is extended or adjusted under 35 U.S.C. 154(b) by 401 days.

(21) Appl. No.: 12/476,462

(22) Filed: Jun. 2, 2009

(65) Prior Publication Data
US 2009/0297108 A1 Dec. 3, 2009

(30) Foreign Application Priority Data
Jun. 3, 2008 (JP) .................. 2008-145752

(51) Int. Cl.
*G02B 6/30* (2006.01)
*G02B 6/12* (2006.01)
(52) U.S. Cl. .......................... 385/49; 385/14
(58) Field of Classification Search .................. 385/49
See application file for complete search history.

(56) References Cited

U.S. PATENT DOCUMENTS

| 3,379,653 | A | 4/1968 | Ernst et al. |
| 3,586,616 | A | 6/1971 | Kropp |
| 3,708,296 | A | 1/1973 | Schlesinger |
| 4,058,400 | A | 11/1977 | Crivello |
| 4,068,091 | A | 1/1978 | Doi |
| 4,069,055 | A | 1/1978 | Crivello |
| 4,139,655 | A | 2/1979 | Tsao |
| 4,161,478 | A | 7/1979 | Crivello |

(Continued)

FOREIGN PATENT DOCUMENTS
JP 08-313756 11/1996
(Continued)

OTHER PUBLICATIONS

W. R. Watt et al. "A Novel Photoinitiator of Cationic Polymerization: Preparation and Characterization of Bis [4-(diphenylsulfonio) phenyl]sulfide-Bis-Hexafluorophosphate", Journal of Polymer Science, Polymer Chemistry Edition, vol. 22, pp. 1789-1796, (1984).

*Primary Examiner* — Omar Rojas
(74) *Attorney, Agent, or Firm* — Wenderoth, Lind & Ponack, L.L.P.

(57) ABSTRACT

An optical waveguide substrate with an optical fiber fixation groove, including an optical waveguide which contains a lower cladding layer on a base substrate, wherein the lower cladding layer has an optical fiber fixation groove and a core groove, and a weir is provided between the optical fiber fixation groove and the core groove. The optical waveguide substrate with an optical fiber fixation groove is produced by forming a lower cladding layer on a base substrate using a male stamp produced from a female stamp and then successively forming a core layer and an upper cladding layer thereon.

9 Claims, 2 Drawing Sheets

U.S. PATENT DOCUMENTS

| | | | |
|---|---|---|---|
| 4,231,951 A | | 11/1980 | Smith et al. |
| 4,256,828 A | | 3/1981 | Smith |
| 5,799,118 A | * | 8/1998 | Ogusu et al. ............... 385/14 |
| 7,369,720 B2 | * | 5/2008 | Yokino et al. ............... 385/14 |
| 7,620,285 B2 | * | 11/2009 | Suzuki et al. ............... 385/132 |

FOREIGN PATENT DOCUMENTS

| | | |
|---|---|---|
| JP | 2000-105324 | 4/2000 |
| JP | 2000-131556 | 5/2000 |
| JP | 2004-198653 | 7/2004 |
| JP | 2004-347895 | 12/2004 |

* cited by examiner

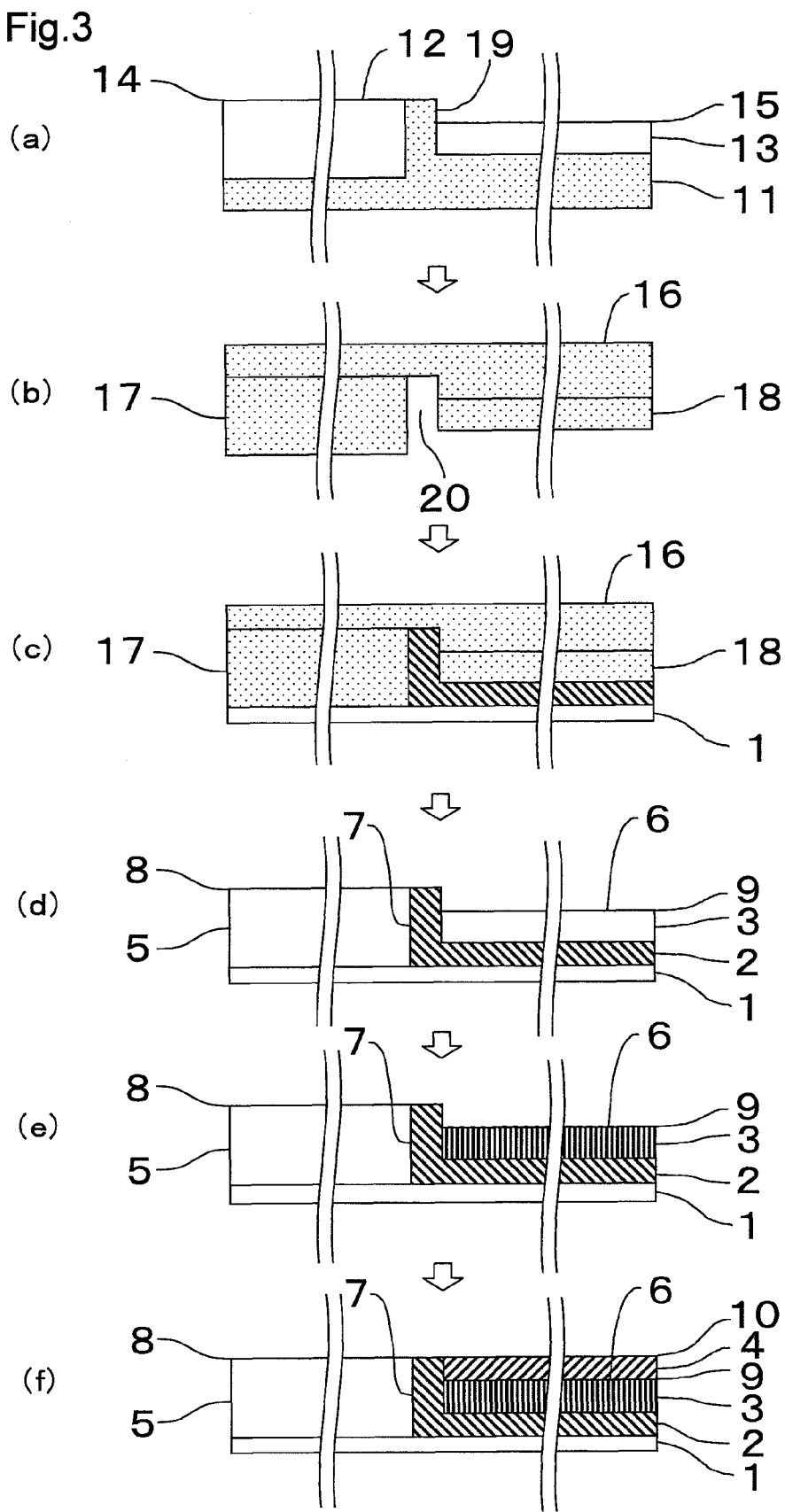

OPTICAL WAVEGUIDE SUBSTRATE WITH OPTICAL FIBER FIXATION GROOVE, PROCESS FOR ITS PRODUCTION, STAMPS FOR USE IN THIS PRODUCTION PROCESS, AND OPTO-ELECTRONIC HYBRID INTEGRATED MODULE INCLUDING SAID OPTICAL WAVEGUIDE SUBSTRATE

BACKGROUND OF THE INVENTION

1. Field of the Invention

The present invention relates to an optical waveguide substrate with an optical fiber fixation groove, a process for its production, stamps for use in this production process, and an opto-electronic hybrid integrated module including the optical waveguide substrate.

2. Description of the Related Art

Along with the practical applications of optical transmission systems, techniques relevant to optical waveguides as their basic components have drawn much attention. An optical waveguide has, typically, an embedded type structure in which a core layer having a high refractive index is surrounded with a cladding layer having a low refractive index, or a ridge type structure in which a core layer having a high refractive index is formed on a lower cladding layer having a low refractive index and an upper cladding layer is an air layer. Thus, light incoming to the optical waveguide is transmitted in the core layer while being reflected at the interface between the core layer and the cladding layers or at the interface between the core layer and the air layer.

In general, at the connection portion or terminal portion of an optical fiber to be used for optical transmission systems, an optical waveguide is used to connect the optical fiber with another optical fiber or to communicate optical signals with a light receiving element and a light emitting element. As a method for optical coupling of an optical fiber with an optical waveguide, an optical fiber fixation groove is formed, in series with a core layer of the optical waveguide, on a base substrate on which the optical waveguide is formed, and the optical fiber is inserted into and fixed in the fixation groove, for the purpose of carrying out optical axis adjustment in a simple and easy manner.

For example, Japanese Patent Laid-open Publication (Kokai) No. Hei 8-313756 discloses a method of forming an optical fiber fixation groove on a silicon substrate by reactive ion etching and then forming an optical waveguide made of glass fine particle films in the vicinity of the optical fiber fixation groove. Further, Japanese Patent Laid-open Publications (Kokai) Nos. 2000-105324 and 2000-131556 disclose methods of forming an optical waveguide made of a siloxane polymer on an alumina ceramic substrate and then forming an optical fiber fixation groove by dicing. Further, Japanese Patent Laid-open Publication (Kokai) No. 2004-198653 discloses a method of forming a quartz-type optical waveguide on a silicon substrate and then forming an optical fiber fixation groove by anisotropic etching (e.g., wet etching).

However, if an optical waveguide and an optical fiber fixation groove are formed separately on a base substrate, it is needed to carry out precise positioning between the core of an optical fiber and the core layer of the optical waveguide, and therefore, it results in a problem that the production process becomes complicated. Therefore, Japanese Patent Laid-open Publication (Kokai) No. 2004-347895 discloses a method of producing a base substrate having an optical fiber fixation groove and a core groove by press forming the base substrate with a master die having a convex portion corresponding to the optical fiber fixation groove and a convex portion corresponding to the core groove for forming the core layer of an optical waveguide. According to this method, once a master die is produced, every time of forming an optical waveguide and an optical fiber fixation groove, it becomes no need to carry out precise positioning between the core of an optical fiber and the core layer of an optical waveguide, and therefore, it results in an advantageous effect that production efficiency can be improved.

SUMMARY OF THE INVENTION

However, with respect to the method disclosed in Japanese Patent Laid-open Publication (Kokai) No. 2004-347895, since a base substrate having an optical fiber fixation groove and a core groove is produced by press forming with a master die, there is a problem that a material constituting the base substrate is limited to materials (e.g., thermoplastic resins) which are suitable for press forming. Further, if press forming is carried out with a master die, there is a problem that forming failure occurs to cause a decrease in size precision when the property of separating a base substrate from a master die is deteriorated. Further, even if the property of separating a base substrate from a master die is improved by applying a release agent to the master die, there is another problem that the removal of the release agent becomes difficult.

Under the above circumstances, an object to be solved by the present invention is to provide an optical waveguide with an optical fiber fixation groove, which makes it possible to form an optical fiber fixation groove and an optical waveguide with high size precision on an arbitrarily selected base substrate and which requires no precise positioning between the core of an optical fiber and the core layer of the optical waveguide; a process for its production in a simple and easy manner; stamps for use in this production process; and an opto-electronic hybrid integrated module including the optical waveguide substrate.

The present inventors have made various studies, and as a result, they have found that if a lower cladding layer which has an optical fiber fixation groove and a core groove and which is provided with a weir between the optical fiber fixation groove and the core groove is formed on a base substrate by making use of soft lithography with a male stamp produced from a female stamp which has a concave portion corresponding to the optical fiber fixation groove and a concave portion corresponding to the core groove and which is provided with a convex portion corresponding to the weir between the concave portion corresponding to the optical fiber fixation groove and the concave portion corresponding to the core groove, an optical waveguide with an optical fiber fixation groove, which requires no need to limit a material constituting the base substrate, which makes it possible to form the optical fiber fixation groove and the optical waveguide with high size precision on the base substrate, and which requires no precise positioning between the core of an optical fiber and the core layer of the optical waveguide, can be produced in a simple and easy manner, thereby completing the present invention.

That is, the present invention provides an optical waveguide substrate with an optical fiber fixation groove, comprising a lower cladding layer formed on a base substrate, a core layer formed on the lower cladding layer, an upper cladding layer formed on the lower cladding layer and the core layer in a manner of embedding the core layer therein, and the optical fiber fixation groove formed, in series with the core layer, on the lower cladding layer, wherein the lower cladding layer has the optical fiber fixation groove and a core groove for the core layer, and a weir is provided between the optical fiber fixation groove and the core groove.

In the optical waveguide substrate with an optical fiber fixation groove according to the present invention, the upper face of the core groove may preferably be lower than the upper face of the optical fiber fixation groove. Further, the lower cladding layer may preferably be made of a cured product of a UV-curable epoxy resin.

The present invention further provides a process for producing an optical waveguide substrate with an optical fiber fixation groove as described above, comprising steps of:

(a) preparing a male stamp from a female stamp, wherein the male stamp has a convex portion corresponding to the optical fiber fixation groove and a convex portion corresponding to a core groove, and the male stamp is provided with a concave portion corresponding to a weir between the convex portion corresponding to the optical fiber fixation groove and the concave portion corresponding to the core groove; and the female stamp has a concave portion corresponding to the optical fiber fixation groove and a concave portion corresponding to the core groove, and the female stamp is provided with a convex portion corresponding to the weir between the concave portion corresponding to the optical fiber fixation groove and the concave portion corresponding to the core groove;

(b) forming a lower cladding layer on a base substrate, wherein the lower cladding layer has the optical fiber fixation groove and the core groove, and the weir is provided between the optical fiber fixation groove and the core groove, by applying a cladding material to the base substrate, placing the male stamp in a manner that the convex portion corresponding to the optical fiber fixation groove and the convex portion corresponding to the core groove are opposed to the base substrate, curing the cladding material, and then removing the male stamp;

(c) forming a core layer by injecting and filling a core material into the core groove and then curing the core material; and (d) forming an upper cladding layer by applying a cladding material to the lower cladding layer and the core layer in a region on which the core layer is formed in a manner of embedding the core layer therein and then curing the cladding material.

In the process for producing an optical waveguide substrate with an optical fiber fixation groove according to the present invention, in place of the step (b) of forming a lower cladding layer on a base substrate, wherein the lower cladding layer has the optical fiber fixation groove and the core groove, and the weir is provided between the optical fiber fixation groove and the core groove, by applying a cladding material to the base substrate, placing the male stamp in a manner that the convex portion corresponding to the optical fiber fixation groove and the convex portion corresponding to the core groove are opposed to the base substrate, curing the cladding material, and then removing the male stamp, there may be employed another step of forming a lower cladding layer on a base substrate, wherein the lower cladding layer has the optical fiber fixation groove and the core groove, and the weir is provided between the optical fiber fixation groove and the core groove, by placing the male stamp in a manner that the convex portion corresponding to the optical fiber fixation groove and the convex portion corresponding to the core groove are opposed to the base substrate, injecting and filling a cladding material into a space between the base substrate and the male stamp, curing the cladding material, and then removing the male stamp.

In the process for producing an optical waveguide substrate with an optical fiber fixation groove according to the present invention, the upper face of the concave portion corresponding to the core groove may preferably be lower than the upper face of the concave portion corresponding to the optical fiber fixation groove in the female stamp. Further, the cladding material for forming the lower cladding layer may preferably be a UV-curable epoxy resin.

The present invention further provides a stamp for use in a process for producing an optical waveguide substrate with an optical fiber fixation groove as described above, comprising:

a concave portion corresponding to the optical fiber fixation groove, a concave portion corresponding to a core groove, and a convex portion corresponding to a weir between the concave portion corresponding to the optical fiber fixation groove and the concave portion corresponding to the core groove; or alternatively, a convex portion corresponding to the optical fiber fixation groove, a convex portion corresponding to a core groove and a concave portion corresponding to a weir between the concave portion corresponding to the optical fiber fixation groove and the concave portion corresponding to the core groove.

The present invention further provides an opto-electronic hybrid integrated module comprising an optical waveguide substrate with an optical fiber fixation groove as described above.

According to the present invention, a lower cladding layer which has an optical fiber fixation groove and a core groove and which is provided with a weir between the optical fiber fixation groove and the core groove is formed by making use of soft lithography with a male stamp produced from a female stamp which has a concave portion corresponding to the optical fiber fixation groove and a concave portion corresponding to the core groove and which is provided with a convex portion corresponding to the weir between the concave portion corresponding to the optical fiber fixation groove and the concave portion corresponding to the core groove, and therefore, an optical waveguide with an optical fiber fixation groove can be obtained in a simple and easy manner, which makes it possible to form the optical fiber fixation groove and the optical waveguide with high size precision on an arbitrarily selected base substrate and which requires no precise positioning between the core of an optical fiber and the core layer of the optical waveguide.

Further, an optical waveguide substrate with an optical fiber fixation groove can be produced just like intaglio printing on a large scale from an industrial point of view by, while continuously drawing out a base substrate in the form of a roll and allowing the base substrate to run, bringing the base substrate into contact with a roll having a male stamp attached thereon to form a lower cladding layer which has the optical fiber fixation groove and a core groove on the base substrate and which is provided with a weir between the optical fiber fixation groove and the core groove, wherein the male stamp is produced from a female stamp which has a concave portion corresponding to the optical fiber fixation groove and a concave portion corresponding to the core groove and which is provided with a convex portion corresponding to the weir between the concave portion corresponding to the optical fiber fixation groove and the concave portion corresponding to the core groove; and then successively forming a core layer and an upper cladding layer thereon.

Further, with respect to the resultant optical waveguide substrate with an optical fiber fixation groove, since the lower cladding layer, the core layer, and the upper cladding layer are formed on the base substrate, if an electric wiring film substrate is used as the base substrate, an opto-electronic hybrid integrated module can be produced in a simple and easy manner by cutting a portion(s), on which a light emitting element(s) and/or a light receiving element(s) are/is to be mounted, with a dicing saw into "V" shape to form a 45° mirror(s).

BRIEF DESCRIPTION OF THE DRAWINGS

FIGS. 3(a)-(f) are schematic step drawings for explaining a typical example of a process for producing an optical waveguide substrate with an optical fiber fixation groove according to the present invention.

DETAILED DESCRIPTION OF THE INVENTION

<<Optical Waveguide Substrate with Optical Fiber Fixation Groove>>

The optical waveguide substrate with an optical fiber fixation groove according to the present invention (hereinafter, referred to sometimes as the "optical waveguide substrate of the present invention" or simply as the "optical waveguide substrate") comprises a lower cladding layer formed on a base substrate, a core layer formed on the lower cladding layer, an upper cladding layer formed on the lower cladding layer and the core layer in a manner of embedding the core layer therein, and an optical fiber fixation groove formed, in series with the core layer, on the lower cladding layer, wherein the lower cladding layer has the optical fiber fixation groove and the core groove, and a weir is provided between the optical fiber fixation groove and the core groove.

The optical waveguide substrate of the present invention has the optical fiber fixation groove and the optical waveguide on the base substrate; the optical fiber fixation groove is formed in series with the core layer of the optical waveguide; the position of the core of an optical fiber to be mounted in the optical fiber fixation groove fits with the position of the core layer of the optical waveguide; and therefore, optical signals can be communicated between the optical fiber to be mounted in the optical fiber fixation groove and the core layer of the optical waveguide.

Figure 1:
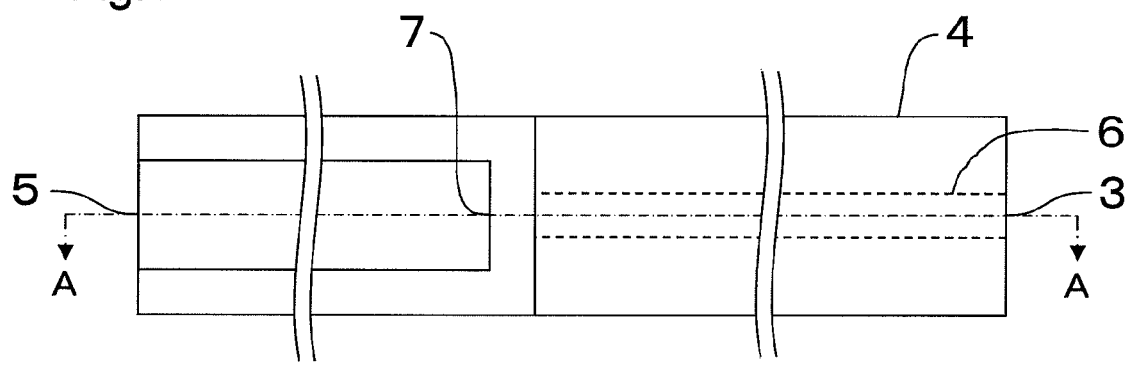
FIG. 1 is a partial plane view schematically showing a configuration of a typical example of an optical waveguide substrate with an optical fiber fixation groove according to the present invention.
Figure 2:
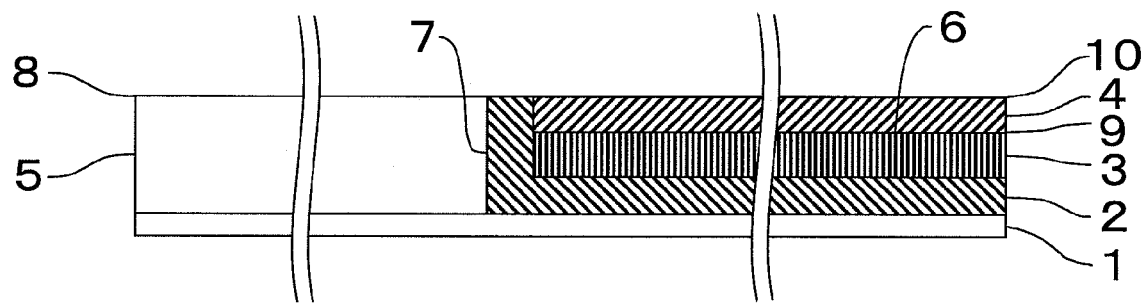
FIG. 2 is a partial cross sectional view schematically showing a cross section of the optical waveguide substrate cut along A-A line in FIG. 1.

A typical example of the optical waveguide substrate of the present invention is shown in FIGS. 1 and 2. The optical waveguide substrate of the present invention is not limited to the typical example, and its structure and composition may appropriately be modified or varied. FIG. 1 is a partial plane view of the optical waveguide substrate when viewed from the upper side. FIG. 2 is a partial cross sectional view showing a cross section of the optical waveguide substrate cut along A-A line in FIG. 1.

As shown in FIG. 1, when the optical waveguide substrate is viewed from the upper side, an optical fiber fixation groove 5 is formed on the left side. On the other hand, an optical waveguide (having no reference numeral) is formed on the right side, and particularly, an upper cladding layer 4 is formed in a manner of embedding a core layer 3 therein, the core layer 3 being formed in a core groove 6. The optical fiber fixation groove 5 is formed in series with the core layer 3 so that the position of the core of an optical fiber (not shown) fits with the position of the core layer 3 formed in the core groove 6. A weir 7 is provided between the optical fiber fixation groove 5 and the core groove 6.

As shown in FIG. 2, when the cross section of the optical waveguide substrate cut along A-A line in FIG. 1 is viewed, a lower cladding layer 2 having the optical fiber fixation groove 5 and the core groove 6 is formed on a base substrate 1. The lower cladding layer 2 is directly adhered to the base substrate 1 without an adhesive layer or any other layer interposed between the lower cladding layer 2 and the base substrate 1. The optical fiber fixation groove 5 is formed in series with the core layer 3 so that the position of the core of an optical fiber (not shown) fits with the position of the core layer 3 formed in the core groove 6. Therefore, the upper face 9 of the core groove 6 may preferably be lower than the upper face 8 of the optical fiber fixation groove 5. A difference between the upper face 8 of the optical fiber fixation groove 5 and the upper face 9 of the core groove 6 may preferably correspond to the thickness of the upper cladding layer 4. Therefore, the upper face 8 of the optical fiber fixation groove 5 and the upper face 10 of the upper cladding layer 4 can be made approximately flat.

When an optical fiber is inserted into and fixed in the optical waveguide substrate of the present invention, after the optical fiber (not shown) is inserted into the optical fiber fixation groove 5 of the optical waveguide substrate, a member for fixation (e.g., a flat member on the optical waveguide substrate) is placed thereon and fixed with, for example, an adhesive. Therefore, if the upper face 8 of the optical fiber fixation groove 5 and the upper face 10 of the upper cladding layer 4 are approximately flat, the adhesion strength between the optical waveguide substrate and the member for fixation can be enhanced. Further, a plurality of optical waveguide substrates can also be arranged in layers to form a multilayer structure.

The weir 7 is provided between the optical fiber fixation groove 5 and the core groove 6. The weir 7 is formed of a cladding material constituting the lower cladding layer 2 to have an appropriate thickness (i.e., an interval between the optical fiber fixation groove 5 and the core groove 6), so that it does not cause any trouble for the communication of optical signals between the core of an optical fiber (not shown) to be mounted in the optical fiber fixation groove 5 and the core layer 3 formed in the core groove 6. The thickness of the weir 7 may preferably be not smaller than 5 μm and not greater than 50 μm. If the thickness of the weir 7 is too small, the weir 7 may be unable to be clearly transferred when the lower cladding layer 2 is formed with a male stamp having a concave portion corresponding to the weir 7. In contrast, if the thickness of the weir 7 is too great, the transmission loss of optical signals between the core of an optical fiber (not shown) to be mounted in the optical fiber fixation groove 5 and the core layer 3 formed in the core groove 6 may become increased. The height of the weir 7 (i.e., the height from the bottom face of the core groove 6) may appropriately be set depending on the outer diameter, core diameter, and other factors of an optical fiber to be mounted in the optical fiber fixation groove 5, and it is not particularly limited.

Then, as shown in FIGS. 1 and 2, the upper cladding layer 4 is formed on the lower cladding layer 2 and the core layer 3 in a manner of embedding the core layer 3 therein. The core layer 3 and the upper cladding layer 4 are directly adhered to the lower cladding layer 2 without an adhesive layer(s) or any other layer(s) interposed between the core layer 3 and the lower cladding layer 2 and/or between the upper cladding layer 4 and the lower cladding layer 2. The base substrate 1, the lower cladding layer 2, the core layer 3, and the upper cladding layer 4 are made of various organic materials. The lower cladding layer 2 may preferably be made of a cured product of a UV-curable epoxy resin.

In FIGS. 1 and 2, only one optical fiber fixation groove 5 and only one core layer 3 are formed; however, two or more optical fiber fixation grooves may be formed and/or two or more core layers may be formed, depending on the applications of the optical waveguide substrate. Further, the core layer 3 is formed in a line extending along the right and left direction on the paper face; however, it may be formed in a prescribed pattern depending on the applications of the optical waveguide substrate.

<Base Substrate>

The optical waveguide substrate of the present invention has an optical fiber fixation groove and an optical waveguide on a base substrate. Examples of a material constituting the base substrate may be organic materials (e.g., epoxy type resins, polyimide type resins, acrylic type resins, polyester type resins, polystyrene type resins, cycloolefin type resins, polyether sulfone type resins, polyether ketone type resins, polyether nitrile type resins, oxetane type resins, silane type resins, and silicone type resins) and inorganic materials (e.g., silicon, Group III-V compound semiconductors such as GaAs ad InP, and quartz glass). In the base substrates made of these materials, silicon substrates may be preferred because of their small thicknesses and flat surfaces. Further, taking into consideration the production of an opto-electronic hybrid integrated module, from the viewpoint of heat resistance (in particular, heat resistance assuming welding, specifically heat resistance to temperatures of from 200° C. to 250° C.), films made of polyimide type resins, i.e., polyimide films (including halogenated polyimide films) may be preferred. When polyimide films are used as base substrates, their commercially available products may be used. Examples of polyimide films may include "Kapton (registered trade name)" series, available from Du Pont-Toray Co., Ltd.

The thickness of a base substrate may appropriately be selected depending on the applications of the optical waveguide substrate, and it is not particularly limited; however, it may preferably be 10 μm or greater, more preferably 25 μm or greater, and preferably 100 μm or smaller, more preferably 50 μm or smaller. If the thickness of the base substrate is too small, the strength of the optical waveguide substrate may be lowered. In contrast, if the thickness of the base substrate is too great, the transparency of the substrate may be lowered when an opto-electronic hybrid integrated module is produced.

In the optical waveguide substrate of the present invention, which is different from a case where a base substrate having an optical fiber fixation groove and a core groove is produced by press forming using a master die as disclosed in the Japanese Patent Laid-open Publication (Kokai) No. 2004-347895, a lower cladding layer which has an optical fiber fixation groove and a core groove and which is provided with a weir between the optical fiber fixation groove and the core groove is formed on a base substrate by making use of soft lithography with a male stamp produced from a female stamp which has a concave portion corresponding to the optical fiber fixation groove and a concave portion corresponding to the core groove and which is provided with a convex portion corresponding to the weir between the concave portion corresponding to the optical fiber fixation groove and the concave portion corresponding to the core groove, so that there is no need to limit a material constituting the base substrate and the optical fiber fixation groove and the optical waveguide can be formed with high size precision on the base substrate.

<Lower Cladding Layer>

With respect to the optical waveguide substrate of the present invention, a lower cladding layer having an optical fiber fixation groove and a core groove is formed on a base substrate. In addition, a weir is provided between the optical fiber fixation groove and the core groove. More specifically, the lower cladding layer has an optical fiber fixation groove and a core groove, both of which are formed using a male stamp produced from a female stamp which has a concave portion corresponding to the optical fiber fixation groove and a concave portion corresponding to the core groove and which is provided with a convex portion corresponding to the weir between the concave portion corresponding to the optical fiber fixation groove and the concave portion corresponding to the core groove, and a weir is provided between the optical fiber fixation groove and the core groove.

A cladding material constituting the lower cladding layer may be any of the heretofore known optical waveguide materials, and it is not particularly limited. Examples thereof may include curable resins such as UV-curable (or light-curable) resins and heat-curable resins, and thermoplastic resins. In these resins, UV-curable (or light-curable) resins may be preferred. Examples of the UV-curable (or light-curable) resins may include acrylic type resins and epoxy type resins. The acrylic type resins cause large shrinkage at the time of curing and their curing is highly possibly inhibited by oxygen, resulting in a problem of curability. Therefore, epoxy type resins may be preferred, and UV-curable epoxy resins may particularly be preferred because of their hardly causing warpage at the time of curing.

The thickness of the lower cladding layer may appropriately be selected depending on the applications of the optical waveguide substrate, the wavelength of light to be used, and other factors, and it is not particularly limited; however, it may preferably be 10 μm or greater, and more preferably 20 μm or greater, and preferably 150 μm or smaller, more preferably 100 μm or smaller, in an optical waveguide region excluding the lower side of the core groove. If the thickness of the lower cladding layer is too small, a core layer having a sufficient thickness may be unable to be formed. In contrast, if the thickness of the lower cladding layer is too great, the transparency of the lower cladding layer may be lowered when an opto-electronic hybrid integrated module is produced.

The refractive index of the lower cladding layer is not particularly limited so long as it is lower than that of the core layer; however, it may arbitrarily be adjusted in a range of from 1.45 to 1.65 by selecting the kind of a cladding material.

<Core Layer>

With respect to the optical waveguide substrate of the present invention, a core layer is formed in the core groove formed in the lower cladding layer.

A core material constituting the core layer may be any of the heretofore known optical waveguide materials, and it is not particularly limited so long as it has a refractive index higher than that of a cladding material constituting the lower cladding layer and that of a cladding material constituting the upper cladding layer. Examples thereof may include curable resins such as UV-curable (or light-curable) resins and heat-curable resins, and thermoplastic resins. In these resins, UV-curable (or light-curable) resins may be preferred. Examples of the UV-curable (or light-curable) resins may include acrylic type resins and epoxy type resins. The acrylic type resins cause large shrinkage at the time of curing and their curing is highly possibly inhibited by oxygen, resulting in a problem of curability. Therefore, epoxy type resins may be preferred, and UV-curable epoxy resins may particularly be preferred because of their hardly causing warpage.

The thickness of the core layer may arbitrarily be set depending on the core diameter of an optical fiber to be mounted in the optical fiber fixation groove, the wavelength of light to be used, and other factors, and it is not particularly limited.

The core layer may preferably have a rectangular, most preferably square, shape in the cross section perpendicular to the longitudinal direction. That is, the aspect ratio (width/thickness) of the core layer may preferably be 1/2 or higher, more preferably 2/3 or higher, and still more preferably 5/6 or higher, and preferably 2/1 or lower, more preferably 3/2 or lower, and still more preferably 6/5 or lower. It may most preferably be 1/1. If the aspect ratio of the core layer is too low or too high, the shape of the cross section perpendicular to the longitudinal direction of the core layer becomes flat, so that when light comes in the core layer or light comes out the core layer, light loss may be caused.

The refractive index of the core layer is not particularly limited so long as it is higher than that of the lower cladding layer and that of the upper cladding layer; however, it may arbitrarily be adjusted in a range of from 1.45 to 1.65 by selecting the kind of a core material.

<Upper Cladding Layer>

With respect to the optical waveguide substrate of the present invention, an upper cladding layer is formed on the lower cladding layer and the core layer in an optical waveguide region.

A cladding material constituting the upper cladding layer may be the same as or different from the cladding material constituting the lower cladding layer, and it is not particularly limited. Examples thereof may include curable resins such as UV-curable (or light-curable) curable resins and heat-curable resins, and thermoplastic resins. In these resins, UV-curable (or light-curable) curable resins may be preferred. Examples of the UV-curable (or light-curable) resins may include acrylic type resins and epoxy type resins. The acrylic type resins cause large shrinkage at the time of curing and their curing is highly possibly inhibited by oxygen, resulting in a problem of curability. Therefore, epoxy type resins may be preferred, and UV-curable epoxy resins may particularly be preferred because of their hardly causing warpage.

The thickness of the upper cladding layer may appropriately be selected depending on the outer diameter and core diameter of an optical fiber to be mounted in the optical fiber fixation groove, and it is not particularly limited; however, it may preferably be 10 μm or greater, more preferably 20 μm or greater, and preferably 100 μm or smaller, more preferably 50 μm or smaller. If the thickness of the upper cladding layer is too small or too great, it may become impossible to make the upper face of an optical fiber and the upper face of an optical waveguide approximately flat at the time of inserting the optical fiber into the optical fiber fixation groove and attaching the optical fiber to the optical fiber fixation groove, so that the adhesion strength of the optical fiber may possibly be lowered.

The refractive index of the upper cladding layer is not particularly limited so long as it is lower than that of the core layer; however, it may arbitrarily be adjusted in a range of from 1.45 to 1.65 by selecting the kind of a cladding material.

<Optical Fiber Fixation Groove and Core Groove>

The optical waveguide substrate of the present invention has an optical fiber fixation groove and a core groove, both of which are formed in the lower cladding layer, and also has a weir provided between the optical fiber fixation groove and the core groove, using a male stamp produced from a female stamp which has a concave portion corresponding to the optical fiber fixation groove and a concave portion corresponding to the core groove and which is provided with a convex portion corresponding to the weir between the concave portion corresponding to the optical fiber fixation groove and the concave portion corresponding to the core groove.

An optical fiber for the communication of optical signals with the core layer of the optical waveguide formed on the base substrate is mounted in the optical fiber fixation groove. In the core groove, after a core material is injected and filled, the core material is cured to form the core layer of the optical waveguide. Therefore, the optical fiber fixation groove is formed in series with the core layer so that the position of the core of an optical fiber to be mounted in the optical fiber fixation groove fits with the position of the core layer formed in the core groove. Further, as described above, a weir is provided between the optical fiber fixation groove and the core groove. Even if the weir is provided between the optical fiber fixation groove and the core groove, the communication of optical signals may cause no trouble between the core of an optical fiber to be mounted in the optical fiber fixation groove and the core layer formed in the core groove. Further, as described above, the upper face of the core groove to form the core layer therein may preferably be made lower than the upper face of the optical fiber fixation groove.

The cross sectional shape of the optical fiber fixation groove in the direction perpendicular to the longitudinal direction is not particularly limited; however, there may be exemplified a rectangular shape, a V-shape, and a U-shape.

The width and depth of the optical fiber fixation groove may appropriately be set depending on the outer diameter of an optical fiber to be mounted in the optical fiber fixation groove, and they are not particularly limited.

The width and depth of the core groove may appropriately be set depending on the width and thickness of the core layer of the optical waveguide and the core diameter of an optical fiber to be mounted in the optical fiber fixation groove, and they are not particularly limited.

In the optical waveguide substrate of the present invention, since the optical fiber fixation groove and the core groove are formed with a male stamp produced from a female stamp which has a concave portion corresponding to the optical fiber fixation groove and a concave portion corresponding to the core groove and which is provided with a convex portion corresponding to the weir between the concave portion corresponding to the optical fiber fixation groove and the concave portion corresponding to the core groove, there is no need to carry out precise positioning between the core of an optical fiber to be mounted in the optical fiber fixation groove and the core layer formed in the core groove.

<UV-curable Epoxy Resin>

As described above, UV-curable resins may particularly be preferred as the cladding material constituting the lower cladding layer, the core material constituting the core layer, and the cladding material constituting the upper cladding layer. UV-curable epoxy resins may be prepared by oneself, or alternatively, their commercially available products may be used.

For the purpose of adjusting refractive index and viscosity, the UV-curable epoxy resins may be mixed with bisphenol type epoxy resins and/or alicyclic epoxy resins. In this regard, epoxy resins having lower viscosity may be preferred because of their excellent handling property.

Examples of the bisphenol type epoxy resins may include bisphenol A type epoxy resins, diglycidyl ethers of bisphenol A—alkylene oxide adducts, bisphenol F type epoxy resins, diglycidyl ethers of bisphenol F—alkylene oxide adducts, bisphenol AD type epoxy resins, bisphenol S type epoxy resins, tetramethyl bisphenol A type epoxy resins, tetramethyl bisphenol F type epoxy resins, and halogenated bisphenol type epoxy resins thereof (e.g., fluorinated bisphenol type epoxy resins, chlorinated bisphenol type epoxy resins, brominated bisphenol type epoxy resins). These bisphenol type epoxy resins may be used alone, or two or more of these bisphenol type epoxy resins may also be used in combination. In these bisphenol type epoxy resins, bisphenol A type epoxy resins, bisphenol F type epoxy resins, brominated bisphenol A type epoxy resins, and brominated bisphenol F type epoxy resins may be preferred in terms of their easy availability and handling property. Commercially available products of these bisphenol type epoxy resins may include "jER (registered trade name) 828EL" (a bisphenol A type epoxy resin) and "jER (registered trade name) 5050" (a brominated bisphenol A type epoxy resin), both available from Japan Epoxy Resin Co., Ltd.

The amount of bisphenol type epoxy resin to be mixed may appropriately be adjusted so as to make an epoxy type resin film obtained from a UV-curable epoxy resin have a desired refractive index, and it is not particularly limited. However, if the amount of bisphenol type epoxy resin to be mixed is too great, the flexibility of an epoxy type resin film obtained from a UV-curable epoxy resin may be lowered.

Examples of the alicyclic epoxy resins may include 3,4-epoxycyclohexylmethyl-3',4'-epoxycyclohexane carboxylate, 1,2-epoxy-vinylcyclohexene, bis(3,4-epoxycyclohexylmethyl)adipate, 1-epoxyethyl-3,4-epoxycyclohexane, limonene diepoxide, 3,4-epoxycyclohexylmethanol, dicyclopentadiene diepoxide, epoxy resins obtained by the oxidation of olefins, such as oligomer type alicyclic epoxy resin ("Epoleed (registered trade name) GT300", "Epoleed (registered trade name) GT400", "EHPE (registered trade name) 3150", all available from Daicel Chemical Industries, Ltd.); epoxy resins obtained by the direct hydrogenation of aromatic epoxy resins, such as hydrogenated bisphenol A type epoxy resins, hydrogenated bisphenol F type epoxy resins, hydrogenated bisphenol type epoxy resins, hydrogenated phenol novolak type epoxy resins, hydrogenated cresol novolak type epoxy resins, and hydrogenated naphthalene type epoxy resins; epoxy resins obtained by the hydrogenation of polyhydric phenols, followed by the reaction with epichlorohydrin. These alicyclic epoxy resins may be used alone, or two or more of these alicyclic epoxy resins may also be used in combination. In these alicyclic epoxy resins, 3,4-epoxycyclohexylmethyl-3',4'-epoxycyclohexane carboxylate, hydrogenated bisphenol A type epoxy resins, and hydrogenated bisphenol F type epoxy resins may be preferred in terms of their easy availability, low viscosity, and excellent workability.

The amount of alicyclic epoxy resin to be mixed may appropriately be adjusted so as to make a UV-curable epoxy resin have desired viscosity, and it is not particularly limited. However, if the amount of alicyclic epoxy resin to be mixed is great, an epoxy type resin film obtained from a UV-curable epoxy resin may become hard and brittle.

For the purpose of curing UV-curable epoxy resins, the UV-curable epoxy resins are mixed with photo-cationic polymerization initiators.

Examples of the photo-cationic polymerization initiators may include metal-fluoroboron complex salts and boron trifluoride complex compounds as described in U.S. Pat. No. 3,379,653; bis(perfluoroalkylsulfonyl)-methane metal salts as described in U.S. Pat. No. 3,586,616; aryl diazonium compounds as described in U.S. Pat. No. 3,708,296; aromatic onium salts of group VIa elements as described in U.S. Pat. No. 4,058,400; aromatic onium salts of group Va elements as described in U.S. Pat. No. 4,069,055; dicarbonyl chelates of from group IIIa to Va elements as described in U.S. Pat. No. 4,068,091; thiopyrylium salts as described in U.S. Pat. No. 4,139,655; group VIb elements in form of $MF_6^-$ anions (wherein M is selected from phosphorus, antimony, and arsenic) as described in U.S. Pat. No. 4,161,478; arylsulfonium complex salts as described in U.S. Pat. No. 4,231,951; aromatic iodonium complex salts and aromatic sulfonium complex salts as described in U.S. Pat. No. 4,256,828; bis[4-(diphenylsulfonio)phenyl]sulfide-bis-hexafluorometal salts (e.g., phosphates, arsenates, antimonates) as described by W. R. Watt et al. in the Journal of Polymer Science, Polymer Chemistry, vol. 22, p. 1789 (1984); mixed ligand metal salts of iron compounds; and silanol-aluminum complexes. These photo-cationic polymerization initiators may be used alone, or two or more of these photo-cationic polymerization initiators may also be used in combination. In these photo-cationic polymerization initiators, arylsulfonium complexes, aromatic iodonium complexes or aromatic sulfonium complexes of halogen-containing complex ions, and aromatic onium salts of group II, V, and VI elements may be preferred. Some of these salts are obtained as commercially available products such as "UVI-6976" and "UVI-6992" (available from The Dow Chemical Company); "FX-512" (available from 3 M Company); "UVR-6990" and "UVR-6974" (available from Union Carbide Corporation); "UVE-1014" and "UVE-1016" (available from General Electric Company); "KI-85" (available from Degussa Aktiengesellschaft), "SP-150" and "SP-170" (available from by ADEKA Corporation); and "San-Aid (registered trade name) SI-60L", "San-Aid (registered trade name) SI-80L", "San-Aid (registered trade name) SI-100L", "San-Aid (registered trade name) SI-110L", and "San-Aid (registered trade name) SI-180L" (available from Sanshin Chemical Industry Co., Ltd.).

Further, in these photo-cationic polymerization initiators, onium salts may be preferred, and diazonium salts, iodonium salts, sulfonium salts, and phosphonium salts may particularly be preferred, because they are excellent in handling property and balance between the latent property and the curability.

The amount of photo-cationic polymerization initiator to be mixed may appropriately be adjusted depending on the amount of epoxy resin components to be cured, and it is not particularly limited; however, it may preferably be 0.1 parts by weight or greater, more preferably 0.5 parts by weight or greater, and still more preferably 1 part by weight or greater, and preferably 10 parts by weight or smaller, more preferably 8 parts by weight or smaller, and still more preferably 5 parts by weight or smaller, relative to 100 parts by weight of the total amount of epoxy resin components.

The UV-curable epoxy resin is in a liquid state at normal temperature. Therefore, when a lower cladding layer is formed, the UV-curable epoxy resin is applied to a base substrate, and a male stamp is placed on the base substrate in a manner that a convex portion corresponding to an optical fiber fixation groove and a convex portion corresponding to a core groove are opposed to the base substrate; or alternatively, a male stamp is placed on the base substrate in a manner that a convex portion corresponding to an optical fiber fixation groove and a convex portion corresponding to a core groove are opposed to the base substrate, and the UV-curable epoxy resin is injected and filled into a space between the base substrate and the male stamp; followed by curing the UV-curable epoxy resin, for example, through irradiation of ultraviolet rays having an integrated illumination intensity (energy density) of from 0.01 to 10 $J/cm^2$, to obtain a cured epoxy type resin film constituting the lower cladding layer. When a core layer is formed, the UV-curable epoxy resin is injected and filled into a core groove formed in the lower cladding layer, followed by curing the UV-curable epoxy resin, for example, through irradiation of ultraviolet rays having an integrated illumination intensity (energy density) of from 0.01 to 10 J/cm², to obtain a cured epoxy type resin film constituting the core layer. When an upper cladding layer is formed, the UV-curable type resin is applied to the lower cladding layer and the core layer in a region on which the core layer is formed in a manner of embedding the core layer therein, followed by curing the UV-curable epoxy resin, for example, through irradiation of ultraviolet rays having an integrated illumination intensity (energy density) of from 0.01 to 10 J/cm², to obtain a cured epoxy type resin film constituting the lower cladding layer.

<<Applications of Optical Waveguide Substrate with Optical Fiber Fixation Groove>>

In the optical waveguide substrate with an optical fiber fixation groove according to the present invention, an optical fiber is inserted into the optical fiber fixation groove, and then, for example, a cladding material is added dropwise to a space between the optical fiber fixation groove and the optical fiber, followed by curing the cladding material, to attach and fix the optical fiber to the optical fiber fixation groove. The optical waveguide substrate in which the optical fiber is mounted in such a manner can widely be used for optical parts related to optical communication technology, such as opto-electronic hybrid integrated modules and optical interconnects.

<<Process for Producing Optical Waveguide Substrate with Optical Fiber Fixation Groove>>

The process for producing an optical waveguide substrate with an optical fiber fixation groove according to the present invention (hereinafter, referred to sometimes as the "production process of the present invention") comprises steps of:

(a) preparing a male stamp from a female stamp, wherein the male stamp has a convex portion corresponding to the optical fiber fixation groove and a convex portion corresponding to a core groove, and the male stamp is provided with a concave portion corresponding to a weir between the convex portion corresponding to the optical fiber fixation groove and the concave portion corresponding to the core groove; and the female stamp has a concave portion corresponding to the optical fiber fixation groove and a concave portion corresponding to the core groove, and the female stamp is provided with a convex portion corresponding to the weir between the concave portion corresponding to the optical fiber fixation groove and the concave portion corresponding to the core groove;

(b) forming a lower cladding layer on a base substrate, wherein the lower cladding layer has the optical fiber fixation groove and the core groove, and the weir is provided with between the optical fiber fixation groove and the core groove, by applying a cladding material to the base substrate, placing the male stamp in a manner that the convex portion corresponding to the optical fiber fixation groove and the convex portion corresponding to the core groove are opposed to the base substrate, curing the cladding material, and then removing the male stamp;

(c) forming a core layer by injecting and filling a core material into the core groove and then curing the core material; and (d) forming an upper cladding layer by applying a cladding material to the lower cladding layer and the core layer in a region on which the core layer is formed in a manner of embedding the core layer therein and then curing the cladding material.

In the production process of the present invention, in place of the step (b) of forming a lower cladding layer on a base substrate, wherein the lower cladding layer has the optical fiber fixation groove and the core groove, and the weir is provided between the optical fiber fixation groove and the core groove, by applying a cladding material to the base substrate, placing the male stamp in a manner that the convex portion corresponding to the optical fiber fixation groove and the convex portion corresponding to the core groove are opposed to the base substrate, curing the cladding material, and then removing the male stamp, there may be employed another step of forming a lower cladding layer on a base substrate, wherein the lower cladding layer has the optical fiber fixation groove and the core groove, and the weir is provided between the optical fiber fixation groove and the core groove, by placing the male stamp in a manner that the convex portion corresponding to the optical fiber fixation groove and the convex portion corresponding to the core groove are opposed to the base substrate, injecting and filling a cladding material into a space between the base substrate and the male stamp, curing the cladding material, and then removing the male stamp.

In general, when an optical waveguide substrate with an optical fiber is produced on a large scale by a stamper method, if the optical fiber is mounted during the step of forming an optical waveguide, it results that the optical fiber in the form of a long cable should be handled while being connected to the optical waveguide in the form of a small chip, and therefore, it requires a space and it becomes considerably troublesome to handle it. Thus, the present inventors have found that if an optical waveguide substrate with an optical fiber fixation groove is produced and then an optical fiber having a needed length is inserted into and fixed in the optical fiber fixation groove, the optical waveguide substrate with the optical fiber can be obtained in a simple and easy manner with high efficiency. That is, in the production process of the present invention, when an optical waveguide and an optical fiber fixation groove are formed on a base substrate, a weir is formed between the optical fiber fixation groove and the core groove so that when an optical fiber is inserted into and fixed in the optical fiber fixation groove of the finally obtained optical waveguide substrate with the optical fiber fixation groove, there is no need to carry out precise positioning between the core of the optical fiber and the core layer of the optical waveguide.

The production process of the present invention is a process comprising forming a lower cladding layer which has an optical fiber fixation groove and a core groove on a base substrate by making use of soft lithography with a second stamp (i.e., a male stamp) which has a convex portion corresponding to the optical fiber fixation groove and a convex portion corresponding to the core groove. The soft lithography is one of the stamper methods and is a method of transferring a lower cladding layer with a second stamp (i.e., a male stamp) formed from a soft material such as a silicone type rubber or an urethane type rubber.

Referring to FIG. 3, a typical example of the production process of the present invention will be described below in detail; however, the production process of the present invention is not limited to the following typical example, and can be carried out with its appropriate modification or variation.

First, as shown in FIG. 3(a), for example, a metal or an alloy such as phosphor bronze is cut to form a concave portion 12 corresponding to an optical fiber fixation groove, a concave portion 13 corresponding to a core groove, and a convex portion 19 corresponding to a weir, to thereby produce a first stamp (i.e., a female stamp) 11.

Then, the first stamp 11 is placed on, for example, a glass substrate with a space between the glass substrate and the first stamp 11. In such a state, a curable silicone material such as a two-component curable silicone rubber is injected and filled into the space between the glass substrate and the first stamp 11. At this time, it is required to appropriately adjust the space between the glass substrate and the first stamp 11; however, spacers such as silicone rubber sheets may be placed between the glass substrate and the first stamp 11 to adjust the space. Alternatively, in place of using spacers, the first stamp 11 may have been provided with two or more convex portions functioning as two or more spacers.

The curable silicone material injected and filled into the space between the glass substrate and the first stamp 11 is cured, and the first stamp 11 is then removed, to thereby produce a second stamp (i.e., a male stamp) 16 having a convex portion 17 corresponding to the optical fiber fixation groove, a convex portion 18 corresponding to the core groove, and a concave portion 20 corresponding to the weir, as shown in FIG. 3(b).

When the second stamp 16 is produced, for the purpose of easily separating the second stamp 16 from the first stamp 11, a release agent may be applied to the first stamp 11. As the release agent, any of the heretofore known release agents may be used, and it is not particularly limited.

Then, a cladding material is applied to a base substrate 1 made of, for example, a polyimide film, and as shown in FIG. 3(c), the second stamp 16 is placed on the base substrate 1 in a manner that the convex portion 17 corresponding to the optical fiber fixation groove and the convex portion 18 corresponding to the core groove are opposed to the base substrate 1, more specifically, the convex portion 17 corresponding to the optical fiber fixation groove is brought into contract with the base substrate 1. In such a state, the cladding material filled into the space between the base substrate 1 and the second stamp 16 is cured, and the second stamp 16 is removed, to thereby form a lower cladding layer 2 having an optical fiber fixation groove 5, a core groove 6, and a weir 7 on the base substrate 1, as shown in FIG. 3(d).

Alternatively, the second stamp 16 is placed on a base substrate 1 made of, for example, a polyimide film, in a manner that the convex portion 17 corresponding to the optical fiber fixation groove and the convex portion 18 corresponding to the core groove are opposed to the base substrate 1, more specifically, the convex portion 17 corresponding to the optical fiber fixation groove is brought into contract with the base substrate 1. In such a state, as shown in FIG. 3(c), a cladding material is injected and filled into a space between the base substrate 1 and the second stamp 16. The cladding material injected and filled into the space between the base substrate 1 and the second stamp 16 is cured, and the second stamp 16 is removed, to thereby form a lower cladding layer 2 having an optical fiber fixation groove 5, a core groove 6, and a weir 7 on the base substrate 1, as shown in FIG. 3(d).

In the lower cladding layer 2, the weir 7 is provided between the optical fiber fixation groove 5 and the core groove 6. Further, the upper face 9 of the core groove 6 may preferably be lower than the upper face 8 of the optical fiber fixation groove 5.

In the production process of the present invention, since the first stamp 11 is provided with the concave portion 12 corresponding to the optical fiber fixation groove 5, the concave portion 13 corresponding to the core groove 6, and the convex portion 19 corresponding to the weir, and also since the second stamp 16 is provided with the convex portion 17 corresponding to the optical fiber fixation groove 5, the convex portion 18 corresponding to the core groove 6, and the concave portion 20 corresponding to the weir, the position of the core of an optical fiber to be mounted in the optical fiber fixation groove 5 in the resultant lower cladding layer 2 can be allowed to fit, with high precision, with the position of a core layer formed in the core groove 6 in the resultant lower cladding layer 2 by appropriately setting the depth of the optical fiber fixation groove 5, i.e., the depth of the concave portion 12 corresponding to the optical fiber fixation groove 5 or the height of the convex portion 17 corresponding to the optical fiber fixation groove 5, as well as the depth of the core groove 6, i.e., the depth of the concave portion 13 corresponding to the core groove 6 or the height of the convex portion 18 corresponding to the core groove 6.

That is, since the lower cladding layer 2 which has the optical fiber fixation groove 5 and the core groove 6 and which is provided with the weir 7 between the optical fiber fixation groove 5 and the core groove 6 is formed on the base substrate 1 by making use of soft lithography with the male stamp produced from the female stamp which has a concave portion corresponding to the optical fiber fixation groove 5 and a concave portion corresponding to the core groove 6 and which is provided with a convex portion 19 corresponding to the weir between the concave portion corresponding to the optical fiber fixation groove 5 and the concave portion corresponding to the core groove 6, an optical fiber fixation groove and an optical waveguide can be formed with high size precision on an arbitrarily selected base substrate, and also, there is no need to carry out precise positioning between the core of an optical fiber and the core layer of an optical waveguide.

In the case where the second stamp 16 is made of silicone type rubber and the lower cladding layer 2 is formed of a heat-curable resin, a thermoplastic resin, or a UV-curable (or light-curable) resin, when the lower cladding layer 2 is formed about several tens of times with the second stamp 16, the second stamp 16 may be deteriorated by heat, changes with time, or other causes. Further, after the lower cladding layer 2 is formed, the second stamp 16 may be contaminated with residues of the cladding material. In such a case, the second stamp 16 may be produced again from the first stamp 11 and then used.

Then, as shown in FIG. 3(e), a core material is injected and filled into the core groove 6, followed by curing the core material, to thereby form a core layer 3. In FIG. 3(e), only one core layer 3 is formed; however, two or more core layers may be formed, depending on the applications of the optical waveguide substrate. Further, the core layer 3 is formed in a line extending along the right and left direction on the paper face; however, it may be formed in a prescribed pattern depending on the applications of the optical waveguide substrate.

In the optical waveguide substrate of the present invention, as described above, the weir 7 is provided between the optical fiber fixation groove 5 and the core groove 6. The reason for this is that the core material does not enter the optical fiber fixation groove 5 when the core material is injected and filled into the core groove 6. In the production process of the present invention, this can be achieved by providing the convex portion 19 corresponding to the weir between the concave portion 12 corresponding to the optical fiber fixation groove 5 and the concave portion 13 corresponding to the core groove 6 in the first stamp 11 as shown in FIG. 3(a).

Then, as shown in FIG. 3(f), a cladding material is applied to the lower cladding layer 2 and the core layer 3 in a region (i.e., an optical waveguide region) on which the core layer 3 is formed in a manner of embedding the core layer 3 therein, and the cladding material is then cured, to thereby form an upper cladding layer 4.

In the optical waveguide substrate of the present invention, as described above, the upper face 9 of the core layer 3 may preferably be lower than the upper face 8 of the optical fiber fixation groove 5. The reason for this is that the upper face 8 of the optical fiber fixation groove 5 and the upper face 10 of the upper cladding layer 4 can be made approximately flat when the upper cladding layer 4 is formed on the lower cladding layer 4 and the core layer 3 in an optical waveguide region in a manner of embedding the core layer 3 therein and that the adhesion strength of an optical fiber can be improved by, for example, placing a glass plate from the upper side when the optical fiber is inserted into and attached to the optical fiber fixation groove 5. In the production process of the present invention, this can be actualized by making the upper face 15 of the concave portion 13 corresponding to the core groove 6 lower than the upper face 14 of the concave portion 12 corresponding to the optical fiber fixation groove 5 in the first stamp 11 as shown in FIG. 3(a).

Specific examples of the curable resins and thermoplastic resins to be used in the present invention may include epoxy type resins, polyimide type resins, acrylic type resins, polystyrene type resins, cycloolefin type resins, polyether sulfone type resins, polyether ketone type resins, polyether nitrile type resins, oxetane type resins, silane type resins, and silicone type resins. These resins may be used alone, and two or more of these resins may also be used in combination. Further, these resins may be those of the solution type, which resins are dissolved in a solvent, or may be those of the solventless type, which resins contain no solvent; however, those of the solventless type may be preferred. Further, when these resins are used as curable resins, a curing agent(s) and/or a crosslinking agent(s) may be used in combination. In the curable resins, UV-curable (or light-curable) resins may be preferred, and UV-curable epoxy resins may particularly be preferred.

When curable resins having low viscosity are used as the cladding material and the core material from the curable resins such as UV-curable (or light-curable) resins and heat-curable resins, a liquid curable resin is injected and filled into the space between the base substrate 1 and the second stamp 16 and into the core groove 6 provided in the lower cladding layer 2, followed by curing the resin with ultraviolet rays (or light) or heat, to thereby form the lower cladding layer 2 and the core layer 3, respectively. Further, when thermoplastic resins are used or when curable resins having high viscosity are used as the cladding material and core material from the curable resins such as UV-curable (or light-curable) resins and heat-curable resins, a resin made to be in fluidized state or melted state by heating is injected and filled into the space between the base substrate 1 and the second stamp 16 and into the core groove 6 provided in the lower cladding layer 2, followed by cooling the resin in the case of a thermoplastic resin or followed by curing the resin with ultraviolet rays (or light) or heat in the case of a curable resin, to thereby form the lower cladding layer 2 and the core layer 3, respectively. In term of workability, the viscosity of each of the materials to be filled may preferably be 0.0001 Pa·s or higher, more preferably 0.001 Pa·s or higher, and preferably 100 Pa·s or lower, more preferably 50 Pa·s or lower. If the viscosity of each of the materials to be filled is too low, it takes a long time for curing, and therefore, workability may be lowered. In contrast, if the viscosity of each of the materials to be filled is too high, handling property may become deteriorated to lower workability or air may be entrapped to form some defects.

Thus, as shown in FIG. 3(f), the optical waveguide substrate having the lower cladding layer 2 formed on the base substrate 1, the core layer 3 formed on the lower cladding layer 2, the upper cladding layer 4 formed on the lower cladding layer 2 and the core layer 3 in a manner of embedding the core layer 3 therein, and the optical fiber fixation groove 5 formed in the lower cladding layer 2 in series with the core layer 3 can be obtained.

In the foregoing, a process for producing only one optical waveguide substrate with the master stamp (i.e., the first stamp 11) as shown in FIG. 3(a) is described; however, two or more optical waveguide substrates can also be produced with a master stamp (i.e., a first stamp) corresponding to two or more optical waveguide substrates. In this case, at the stage that the lower cladding layer 2 is formed on the base substrate 1, respective chips are cut by, for example, dicing, and thereafter, the respective optical waveguide substrates may be produced in the same manner as described above.

According to the production process of the present invention, an optical waveguide substrate with an optical fiber fixation groove, which makes it possible to form an optical fiber fixation groove and an optical waveguide with high size precision on an arbitrarily selected base substrate and which requires no precise positioning between the core of an optical fiber and the core layer of the optical waveguide, can be produced in a simple and easy manner.

Further, an optical waveguide substrate can be produced on a large scale just like intaglio printing by attaching the stamp (i.e., the second stamp 16) made of a resin as shown in FIG. 3(b) to the surface of a roll.

Further, the resultant optical waveguide substrate has the lower cladding layer 2, the core layer 3, and the upper cladding layer 4, all of which are formed on the base substrate 1, and therefore, if an electric wiring film substrate is used as the base substrate 1, an opto-electronic hybrid integrated module can be produced in a simple and easy manner by cutting a portion(s), on which a light emitting element(s) and/or a light receiving element(s) are/is to be mounted, with a dicing saw into "V" shape to form a 45° mirror(s).

<<Stamps for Use in Process for Producing Optical Waveguide Substrate with Optical Fiber Fixation Groove>>

The stamp for use in the process for producing an optical waveguide substrate with an optical fiber fixation groove according to the present invention comprises:

a concave portion corresponding to the optical fiber fixation groove, a concave portion corresponding to a core groove, and a convex portion corresponding to a weir between the concave portion corresponding to the optical fiber fixation groove and the concave portion corresponding to the core groove; or alternatively, a convex portion corresponding to the optical fiber fixation groove, a convex portion corresponding to a core groove, and a concave portion corresponding to a weir between the convex portion corresponding to the optical fiber fixation groove and the convex portion corresponding to the core groove.

As described above, in the production process of the present invention, a lower cladding layer having an optical fiber fixation groove and a core groove is formed on a base substrate by making use of soft lithography. A typical example of a master stamp (i.e., a first stamp) to be used at this time is shown in FIG. 3(a) with reference numeral 11 and a stamp (i.e., a second stamp) made of a resin produced from this master stamp (i.e., the first stamp) is shown in FIG. 3(b) with reference numeral 16.

As shown in FIG. 3(a), the first stamp 11 has a concave portion 12 corresponding to an optical fiber fixation groove and a concave portion 13 corresponding to a core groove, and is provided with a convex portion 19 corresponding to a weir between the concave portion 12 corresponding to the optical fiber fixation groove and the concave portion 13 corresponding to the core groove. The material constituting the first stamp 11 may be either an organic material (e.g., permanent resists, poly(methyl methacrylate), and epoxy type resins) or an inorganic material (e.g., a metal or an alloy such as phosphor bronze, and quartz glass). A method of forming the first stamp 11 may be, for example, photolithography, cutting, and other techniques in the case of an organic material. In the case of an inorganic material, there can be mentioned cutting, etching, air blast, laminating, and other techniques. In these materials and forming methods, taking into consideration durability as a master stamp (i.e., a first stamp), an inorganic material and cutting may particularly be preferred.

In the first stamp 11 as shown in FIG. 3(a), only one concave portion 12 corresponding to an optical fiber fixation groove, only one concave portion 13 corresponding to a core groove, and only one convex portion 19 corresponding to a weir are formed; however, two or more concave portions corresponding to two or more optical fiber fixation grooves, and/or two or more concave portions corresponding to two or more core grooves, and/or two or more convex portions corresponding to two or more weirs may be formed depending on the applications of the optical waveguide substrate. Further, the concave portion 13 corresponding to a core groove is formed in a line extending along the right and left direction on the paper face; however, it may be formed in a prescribed pattern depending on the applications of the optical waveguide substrate. Further, the first stamp 11 as shown in FIG. 3(a) is formed to produce only one optical waveguide substrate; however, it may be formed to produce two or more optical waveguide substrates.

As shown in FIG. 3(b), the second stamp 16 has a convex portion 17 corresponding to an optical fiber fixation groove and a convex portion 18 corresponding to a core groove, and is provided with a concave portion 20 corresponding to a weir between the convex portion 17 corresponding to an optical fiber fixation groove and the convex portion 18 corresponding to a core groove. The material constituting the second stamp 16 is not particularly limited so long as it can be formed with the first stamp 11, and it is not particularly limited. Examples thereof may include curable resins such as UV-curable (or light-curable) resins, heat-curable (or two-component curable) resins, and thermoplastic resins. For example, when curable resins are used, the second stamp 16 can be produced by pouring a curable resin to fill the concave portions formed in the first stamp 11, followed by curing the resin. When thermoplastic resins are used, the second stamp 16 can be produced by placing a thermoplastic resin made to be in fluidized state or melted state by heating on the side where the concave portions of the first stamp 11 are formed, or by pouring a thermoplastic resin made to be in fluidized state or melted state by heating to fill the concave portions of the first stamp 11, followed by, if necessary, cooling under pressure.

In the materials constituting the second stamp 16, silicone materials may particularly be preferred because the property of separating a lower cladding layer to be formed can be improved. In the silicone materials, there may be preferred curable silicone materials such as curable silicone type rubber oligomers or monomers to become silicone type rubber or silicone type resins after curing, and curable silicone type resin oligomers or monomers, and curable polysiloxanes may particularly be preferred. As the curable silicone materials, those which are called "liquid silicones" are usually used, and those of the two-component mixture type to be used in combination with a curing agent may be preferred because of their excellent property of separating a lower cladding layer to be formed as well as their excellent mechanical strength. Further, if curable silicone materials with low viscosity are used, they are excellent in processability for removing air bubbles entrapped at the time of production and they can achieve precise forming of a transfer pattern. Further, curable polysiloxanes may be of either the mono-component curable type or the two-component curable type, and may also be of either the heat-curable type or the room temperature-curable type.

Specific examples of the curable silicone materials may include those which contain alkylsiloxanes, and/or alkenylsiloxanes, and/or alkylalkenylsiloxanes, and/or polyalkylhydrogensiloxanes. Those of the two-component mixture type, containing alkylalkenylsiloxanes and polyalkylhydrogensiloxanes, and having low viscosity and being curable at room temperature, may particularly be preferred in terms of separation property and curability.

In the second stamp 16 as shown in FIG. 3(b), only one convex portion 17 corresponding to an optical fiber fixation groove, only one convex portion 18 corresponding to a core groove, and only one concave portion 20 corresponding to a weir are formed; however, two or more convex portions corresponding to two or more optical fiber fixation grooves, and/or two or more convex portions corresponding to two or more core grooves, and/or two or more concave portions corresponding to two or more weirs may be formed depending on the applications of the optical waveguide substrate. Further, the convex portion 18 corresponding to a core groove is formed in a line extending along the right and left direction on the paper face; however, it may be formed in a prescribed pattern depending on the applications of the optical waveguide substrate. Further, the second stamp 16 as shown in FIG. 3(b) is formed to produce only one optical waveguide substrate; however, it may be formed to produce two or more optical waveguide substrates.

The reason for forming an optical fiber fixation groove and a core groove in the lower cladding layer with a second stamp produced from a first stamp is as follows. When an optical fiber fixation groove and a core groove are formed in the lower cladding layer, if the lower cladding layer is formed with a male stamp having convex portions corresponding to the respective grooves, forming failure occurs to cause a decrease in size precision in the case where the property of separating the lower cladding layer from the male stamp is deteriorated. Further, even if the property of separating the lower cladding layer from the male stamp is improved by applying a release agent to the male stamp, there is another problem that the removal of the release agent becomes difficult. Therefore, for the purpose of forming a lower cladding layer, it is advantageous to produce and use a stamp (i.e., a second stamp (or a male stamp)) made of a resin with a master stamp (i.e., a first stamp (or a female stamp)).

When a second stamp is made of a transparent flexible material such as silicone type rubber, even in the case of a groove having a narrow width just like a core groove, such a groove can clearly be transferred independently of the hardness of a cladding material constituting a lower cladding layer. Therefore, there are advantages that the selection of a cladding material constituting a lower cladding layer becomes wide and that when UV-curable (or light-curable) resins are used, since ultraviolet rays (or light) can be transmitted at the time of curing the resins with ultraviolet rays (or light), a material constituting a base substrate to form the lower cladding layer is not required to be limited to a transparent material.

If the stamp of the present invention is used, an optical waveguide with an optical fiber fixation groove, which makes it possible to form an optical fiber fixation groove and an optical waveguide with high size precision on an arbitrarily selected base substrate by making use of soft lithography and which require no precise positioning between the core of an optical fiber and the core layer of the optical waveguide, can be produced in a simple and easy manner.

<<Opto-electronic Hybrid Integrated Module>>

The opto-electronic hybrid integrated module of the present invention comprises the optical waveguide substrate with an optical fiber fixation groove as described above. More specifically, the opto-electronic hybrid integrated module of the present invention comprises the optical waveguide substrate with an optical fiber fixation groove as described above, an optical fiber inserted and fixed in the optical fiber fixation groove, an electric wiring formed on the rear side of the base substrate, a 45° mirror formed at one end of the optical waveguide (i.e., the other end not opposed to the optical fiber fixation groove), and an optical element mounted on the rear side of the base substrate at which position the 45° mirror is formed.

In the present invention, basically, the state that an optical fiber is inserted and fixed in the optical fiber fixation groove and an optical element is mounted on the electric wiring side of the base substrate is referred to as the opto-electronic hybrid integrated module; however, the state that an optical fiber is not inserted in the optical fiber fixation groove and/or an optical element is not mounted on the electric wiring side of the base substrate may also be referred to as the opto-electronic hybrid integrated module.

The opto-electronic hybrid integrated module of the present invention comprises an optical waveguide formed on a base substrate having an electric wiring on the rear side thereof and a 45° mirror formed at one end of the optical waveguide (i.e., at the other end not opposed to an optical fiber fixation groove), and therefore, if an optical element (i.e., a light emitting element and/or a light receiving element) is mounted on the electric wiring side of the base substrate at which position the 45° mirror is formed, for example, light emitted from the light emitting element is reflected by the 45° mirror and transmitted in the core layer of the optical waveguide, and then comes into an optical fiber inserted and fixed in the optical fiber fixation groove, so that the communication of optical signals can be carried out.

Alternatively, light coming out an optical fiber inserted and fixed in the optical fiber fixation groove is transmitted in the core layer of the optical waveguide and then reflected by the 45° mirror formed at one end of the optical waveguide (i.e., at the other end not opposed to the optical fiber fixation groove), and comes into the light receiving element, so that the communication of optical signals can be carried out.

Further, in the case of an opto-electronic hybrid integrated module comprising an optical waveguide substrate with optical fiber fixation grooves, which has two or more optical fiber fixation grooves and two or more core grooves, for example, in the case of an opto-electronic hybrid integrated module comprising an optical waveguide substrate with optical fiber fixation grooves, which has two or more optical fiber fixation grooves and two or more core grooves, if a light emitting element and a light receiving element are mounted on the electric wiring side of a base substrate, light coming out an optical fiber A inserted and fixed in the optical fiber fixation groove A is transmitted in the core layer A of the optical waveguide A and then reflected by the 45° mirror formed at one end (i.e., at the other end not opposed to the optical fiber fixation groove A) of the optical waveguide A, and comes into the light receiving element and passes through the electric circuit, and is reflected by the 45° mirror B and transmitted in the core layer B of the optical waveguide B, and then comes into the optical fiber B inserted and fixed in the optical fiber fixation groove B, so that the communication of optical signals can be carried out.

The communication of optical signals in the opto-electronic hybrid integrated module of the present invention is not limited to the above system, and it may appropriately be designed depending on the function of the opto-electronic hybrid integrated module.

The opto-electronic hybrid integrated module of the present invention can be produced by, for example, producing an optical waveguide substrate with an optical fiber fixation groove as described above, using an electric wiring film substrate as a base substrate, and then cutting a portion(s), on which an optical element(s) is to be mounted, with a dicing saw into "V" shape to form a 45° mirror(s), and if necessary, mounting an optical element(s) on the electric wiring side of the base substrate and then inserting and fixing an optical fiber into the optical fiber fixation groove. In place of mounting an optical element(s) on the electric wiring side of the base substrate and then inserting and fixing an optical fiber in the optical fiber fixation groove, an optical fiber may be inserted and fixed in the optical fiber fixation groove and then an optical element(s) may be mounted on the electric wiring side of the base substrate.

EXAMPLES

The present invention will be described below in more detail by way of Examples, but the present invention is not limited to the following Examples. The present invention can be put into practice after appropriate modifications or variations within a range meeting the gists described above and later, all of which are included in the technical scope of the present invention.

Example 1

1) A first stamp (i.e., a female stamp) as shown in FIG. 3(a) was produced by cutting the surface of a phosphor bronze plate (having a thickness of 10 mm) to form a concave portion having a width of 130 μm and a depth of 130 μm, corresponding to an optical fiber fixation groove, a concave portion having a width of 50 μm and a depth of 50 μm, corresponding to a core groove, and a convex portion having a thickness of 50 μm and a height of 90 μm, corresponding to a weir between these concave portions.

2) A second stamp (i.e., a male stamp) made of silicone rubber was produced by placing the first stamp on a glass substrate (having a thickness of 2 mm) with a space, and without introducing air bubbles, injecting and filling two-component curable silicon type rubber ("SILPOT 184", available from Toray Dow Corning Corp.) into the space between the glass substrate and the first stamp, and allowing it to stand still at room temperature for 24 hours to cure the silicone type rubber. The resultant second stamp had, as shown in FIG. 3(b), a convex portion corresponding to the optical fiber fixation groove, a convex portion corresponding to the core groove, and a concave portion corresponding to the weir between these convex portions.

3) As shown in FIG. 3(b), on a polyimide film ("Kapton (registered trade name) H" having a thickness of 25 μm, available form Du Pont-Toray Co., Ltd.) as a base substrate, the second stamp was placed in a manner that the convex portion corresponding to the optical fiber fixation groove and the convex portion corresponding to the core groove were opposed to the polyimide film, more specifically, in a manner that the convex portion corresponding to the optical fiber fixation groove was brought into contact with the base substrate, and as shown in FIG. 3(c), without introducing air bubbles, a commercially available UV-curable epoxy resin ("E3129" having a refractive index (n) of 1.52 at a wavelength of 850 nm after curing, available from NTT Advanced Technology Corp.) as a cladding material was injected and filled into the space between the base substrate and the second stamp, and cured by the irradiation of ultraviolet rays from the second stamp side, and then the second stamp was removed to form a lower cladding layer having an optical fiber fixation groove and a core groove on the base substrate as shown in FIG. 3(d). The thickness of the lower cladding layer was equal to the distance between upper face of the core groove and the base substrate, and was 90 μm (the thickness of the lower cladding layer on the lower side of the core groove was 40 μm).

4) A commercially available UV-curable epoxy resin ("E3135" having a refractive index (n) of 1.53 at a wavelength of 850 nm after curing, available from NTT Advanced Technology Corp.) as a core material was added dropwise to the core groove formed in the lower cladding layer, and the core material was filled into the entire core groove by making use of capillary phenomenon and cured by the irradiation of ultraviolet rays to form a core layer having a width of 50 μm and a thickness of 50 μm, as shown in FIG. 3(e).

5) A commercially available UV-curable epoxy resin ("E3129" having a refractive index (n) of 1.52 at a wavelength of 850 nm after curing, available from NTT Advanced Technology Corp.) as a cladding material was added dropwise in an amount needed to fill a portion extending from the upper face of the core layer to the upper face of the weir on the lower cladding layer and the core layer in the region of an optical waveguide, and cured by the irradiation of ultraviolet rays to form an upper cladding layer having a thickness of 40 μm, to thereby obtain an optical waveguide substrate with an optical fiber fixation groove as shown in FIG. 3(f).

6) The core side of a GI type optical fiber (having an outer diameter of 125 μm, a core diameter of 50 μm, and a length of 1 m; one end thereof was the core and the other end thereof was connected to an FC connector) was inserted into the optical fiber fixation groove of the resultant optical waveguide substrate with an optical fiber fixation groove, and a commercially available UV-curable epoxy resin ("E3129" available from NTT Advanced Technology Corp.) was added dropwise to the space between the optical fiber fixation groove and the optical fiber, which was cured by the irradiation of ultraviolet rays from the side of a glass plate placed thereon, so that the optical fiber was attached and fixed to the optical fiber fixation groove. At this time, the upper face of the optical fiber fixation groove and the upper face of the upper cladding layer were approximately flat, and therefore, when the optical fiber was inserted and attached into the optical fiber fixation groove, for example, if a glass plate or other material was placed from the upper side, the adhesion strength of the optical fiber was improved.

In steps 3) to 6), curing of the UV-curable epoxy resins was carried out using ultraviolet rays at a wavelength of 365 nm under the condition of illumination intensity of 10 mW/cm² for 15 minutes, i.e., energy density of 9,000 mJ/cm².

7) The FC connector of the optical fiber was connected to a light source and light (having a wavelength of 850 nm) was led to the optical fiber, and the amount of light coming out the end face of the optical waveguide of the optical waveguide substrate with an optical fiber fixation groove was measured using an actinometer. When insertion loss was determined from a difference in the amount of light between the case where the optical waveguide substrate with an optical fiber fixation groove was inserted between the light source and the actinometer and the case where the optical waveguide substrate with an optical fiber fixation groove was not inserted between the light source and the actinometer, it was 1 dB showing a very small value.

As described above, in this Example, an optical waveguide substrate with an optical fiber fixation groove, which makes it possible to form an optical fiber fixation groove and an optical waveguide with high size precision on an arbitrarily selected base substrate and which requires no precise positioning between the core of an optical fiber and the core layer of the optical waveguide was able to be produced in a simple and easy manner.

The optical waveguide substrate with an optical fiber fixation groove according to the present invention makes it possible to form an optical fiber fixation groove and an optical waveguide with high size precision on an arbitrarily selected base substrate and requires no precious positioning between the core of an optical fiber and the core layer of the optical waveguide. The process for producing an optical waveguide with an optical fiber fixation groove and the stamp for use therein according to the present invention makes it possible to produce such an optical waveguide substrate with an optical fiber fixation groove in a simple and easy manner, and therefore, a remarkable reduction in its production cost can be achieved. Accordingly, the present invention makes a great contribution to various optics related fields and electronic equipment fields, in which the applications of optical waveguide substrates with optical fiber fixation grooves are highly expected.

The invention claimed is:

1. An optical waveguide substrate comprising:
   a lower cladding layer disposed on a base substrate;
   a core layer disposed on said lower cladding layer;
   an upper cladding layer disposed on said lower cladding layer and said core layer in such a manner that said core layer is embedded therein; and
   an optical fiber fixation groove formed, in series with said core layer, on said lower cladding layer,
   wherein said lower cladding layer has said optical fiber fixation groove and a core groove for said core layer, and a weir disposed between said optical fiber fixation groove and said core groove, and
   wherein an upper face of said core groove is lower than an upper face of said optical fiber fixation groove.

2. The optical waveguide substrate, according to claim 1, wherein said lower cladding layer is made of a cured product of a UV-curable epoxy resin.

3. A process for producing an optical waveguide substrate according to claim 1, comprising:
   (a) preparing a male stamp from a female stamp, wherein the male stamp has a convex portion corresponding to the optical fiber fixation groove and a convex portion corresponding to the core groove, and the male stamp is provided with a concave portion corresponding to the weir between the convex portion corresponding to the optical fiber fixation groove and the concave portion corresponding to the core groove; and the female stamp has a concave portion corresponding to the optical fiber fixation groove and a concave portion corresponding to the core groove, and the female stamp is provided with a convex portion corresponding to the weir between the concave portion corresponding to the optical fiber fixation groove and the concave portion corresponding to the core groove;
   (b) forming the lower cladding layer on a base substrate, wherein the lower cladding layer has the optical fiber fixation groove and the core groove, and the weir is disposed between the optical fiber fixation groove and the core groove, by applying a cladding material to the base substrate, placing the male stamp in a manner that the convex portion corresponding to the optical fiber fixation groove and the convex portion corresponding to the core groove are opposed to the base substrate, curing the cladding material, and then removing the male stamp;

(c) forming the core layer by injecting and filling a core material into the core groove and then curing the core material; and (d) forming the upper cladding layer by applying a cladding material to the lower cladding layer and the core layer in a region on which the core layer is formed in a manner so as to embed the core layer therein and then curing the cladding material.

4. The process according to claim 3, wherein an upper face of the concave portion corresponding to the core groove is lower than an upper face of the concave portion corresponding to the optical fiber fixation groove in the female stamp.

5. The process according to claim 3, wherein a cladding material for forming the lower cladding layer is a UV-curable epoxy resin.

6. A stamp for use in a process for producing an optical waveguide substrate with an optical fiber fixation groove according to claim 3, comprising:

the concave portion corresponding to the optical fiber fixation groove, the concave portion corresponding to the core groove, and the convex portion corresponding to the weir between the concave portion corresponding to the optical fiber fixation groove and the concave portion corresponding to the core groove; or alternatively, the convex portion corresponding to the optical fiber fixation groove, a convex portion corresponding to the core groove, and the concave portion corresponding to the weir between the concave portion corresponding to the optical fiber fixation groove and the concave portion corresponding to the core groove.

7. An opto-electronic hybrid integrated module comprising the optical waveguide substrate according to claim 1.

8. The optical waveguide substrate according to claim 1, wherein said weir is integrally formed with said lower cladding layer.

9. The optical waveguide substrate according to claim 1, wherein said weir is made of the same material as that of said lower cladding layer.

* * * * *